United States Patent [19]
Hull

[11] Patent Number: 6,104,834
[45] Date of Patent: *Aug. 15, 2000

[54] MATCHING CCITT COMPRESSED DOCUMENT IMAGES

[75] Inventor: Jonathan J. Hull, Cupertino, Calif.

[73] Assignees: Ricoh Company Limited, Japan; Ricoh Corporation

[*] Notice: This patent issued on a continued prosecution application filed under 37 CFR 1.53(d), and is subject to the twenty year patent term provisions of 35 U.S.C. 154(a)(2).

[21] Appl. No.: 08/695,825

[22] Filed: Aug. 1, 1996

[51] Int. Cl.$^7$ ..................................... G06K 9/62
[52] U.S. Cl. .......................... 382/209; 382/190; 382/218; 382/306
[58] Field of Search ..................................... 382/209, 190, 382/306, 112, 175, 296, 135; 358/400, 403, 449; 395/600, 773

[56] References Cited

U.S. PATENT DOCUMENTS

| | | | |
|---|---|---|---|
| 4,941,193 | 7/1990 | Barnsley et al. | 382/56 |
| 5,065,447 | 11/1991 | Barnsley | 382/56 |
| 5,245,676 | 9/1993 | Spitz | 382/46 |
| 5,263,136 | 11/1993 | DeAguiar et al. | 395/164 |
| 5,267,047 | 11/1993 | Argenta et al. | 358/400 |
| 5,388,167 | 2/1995 | Koga et al. | 382/50 |
| 5,414,781 | 5/1995 | Spitz et al. | 382/296 |
| 5,465,353 | 11/1995 | Hull et al. | 395/600 |
| 5,533,144 | 7/1996 | Fan | 382/135 |
| 5,574,840 | 11/1996 | Kwatinetz et al. | 395/761 |
| 5,586,196 | 12/1996 | Sussman | 382/114 |
| 5,623,679 | 4/1997 | Rivette et al. | 395/773 |
| 5,708,825 | 1/1998 | Sotomayor | 395/762 |

OTHER PUBLICATIONS

Daniel P. Huttenlocher, Gregory A. Klanderman, and William J. Rucklidge, "Comparing Images Using the Hausdorff Distance", *IEEE Transactions on Pattern Analysis and Machine Intelligence*, vol. 15, No. 9, Sep. 1993, pp. 850 to pp. 863.

William Rucklidge, "Efficient Computation of the Minimum Hausdorff Distance for Visual Recognition," *Technical Report*, Department of Computer Science Cornell University, Ithaca, New York, Sep. 1994, pp. 1 to pp. 169.

Jonathan J. Hull, "Document Image Matching and Retrieval With Multiple Distortion–Invariant Descriptors," *International Association for Pattern Recognition Workshop on Document Analysis Systems*, Series in Machine Perception and Artificial Intelligence, vol. 14, published by World Scientific Publishing Co. Pte. Ltd. 1995, pp. 379 to pp. 396.

A. Lawrence Spitz, "Skew Determination in CCITT Group 4 Compressed Document Images," pp. 11 to pp. 25 (last reference 1989).

*Primary Examiner*—Bhavesh Mehta
*Assistant Examiner*—Kanji Patel
*Attorney, Agent, or Firm*—Townsend and Townsend and Crew LLP

[57] ABSTRACT

A fast, memory efficient, and accurate document image matching system is disclosed. Document image matching is based on identifying anchor points of characters in the document. The document matching process includes a feature extraction step where anchor points, e.g., points representing approximate locations of characters, are identified as features for matching. In a particularly efficient implementation, the anchor points are "pass codes" in a two-dimensionally encoded representation of a document image.

38 Claims, 4 Drawing Sheets

Let the base of
$l$th level has size
is less than $\frac{4}{3}N^2$

*FIG. 4A*

Let the base of
$l$th level has size
is less than $\frac{4}{3}N^2$

*FIG. 4B*

MATCHING CCITT COMPRESSED DOCUMENT IMAGES

BACKGROUND OF THE INVENTION

The present invention relates to a document analysis system and more particularly to efficient techniques for matching one document to another.

Matching an electronic representation of one image to an electronic representation of another image is useful in many applications. For example, consider an automatic filing application in which document images are stored in directories that contain "similar" documents, where similarity is defined by the degree to which two images have significant areas in common.

There are several available approaches for matching document images. Most approaches can be characterized as consisting of two steps, feature extraction followed by matching of the extracted features to document images in a database. An input image is matched to a database image if they share a significant number of features.

The feature extraction technique used is critical to the performance of the matching system. Ideally, feature extraction should be fast, memory-efficient, and should result in a unique representation for the input image. The uniqueness of the representation assures that a given document image closely matches itself with a high probability and matches no other documents.

Examples of prior art feature extraction techniques used for document image matching operate based on e.g., image texture, character transition probabilities, sequences of consecutive word lengths, invariant relationships between graphic elements of a document, spacings between boxes surrounding connected sets of pixels, etc. What is needed is a document matching system based on feature extraction that improves on the prior art techniques in speed, memory efficiency, and uniqueness of representation.

SUMMARY OF THE INVENTION

A fast, memory efficient, and accurate document image matching system is provided by virtue of the present invention. In certain embodiments, document image matching is based on identifying anchor points of characters in the document. The document matching process includes a feature extraction step where anchor points, e.g., points representing approximate locations of characters, are identified as features for matching.

In a particularly efficient implementation, the anchor points are "pass codes" in a line-by-line compressed representation of a document image. A pass code within a compressed representation of a given line indicates that a run of white or black pixels present substantially above the pass code on a previous line is not found on a current line. CCITT Group III and Group IV facsimile coding standards are examples of compression schemes that make use of pass codes as may be exploited by the present invention.

Another feature provided by the present invention is the application of a modified Hausdorff metric to compare a set of anchor points found in an input document image and sets of anchor points previously identified for prospective matching document images. This metric has been found to be efficient to compute and robust to image degradation caused by photocopying.

A passcode based implementation has been found to provide fast and accurate matching even when given only one square inch patches of images to use for matching. This type of matching system may be easily embodied in a facsimile receiver where the appropriate compressed representation is already available.

A further understanding of the nature and advantages of the inventions herein may be realized by reference to the remaining portions of the specification and the attached drawings.

BRIEF DESCRIPTION OF THE DRAWINGS

FIG. 4A depicts the pass codes in a scanned photocopy of a document.

FIG. 4B depicts the pass codes in a scanned original of the document of FIG. 4A.

DESCRIPTION OF SPECIFIC EMBODIMENTS

Figure 1:
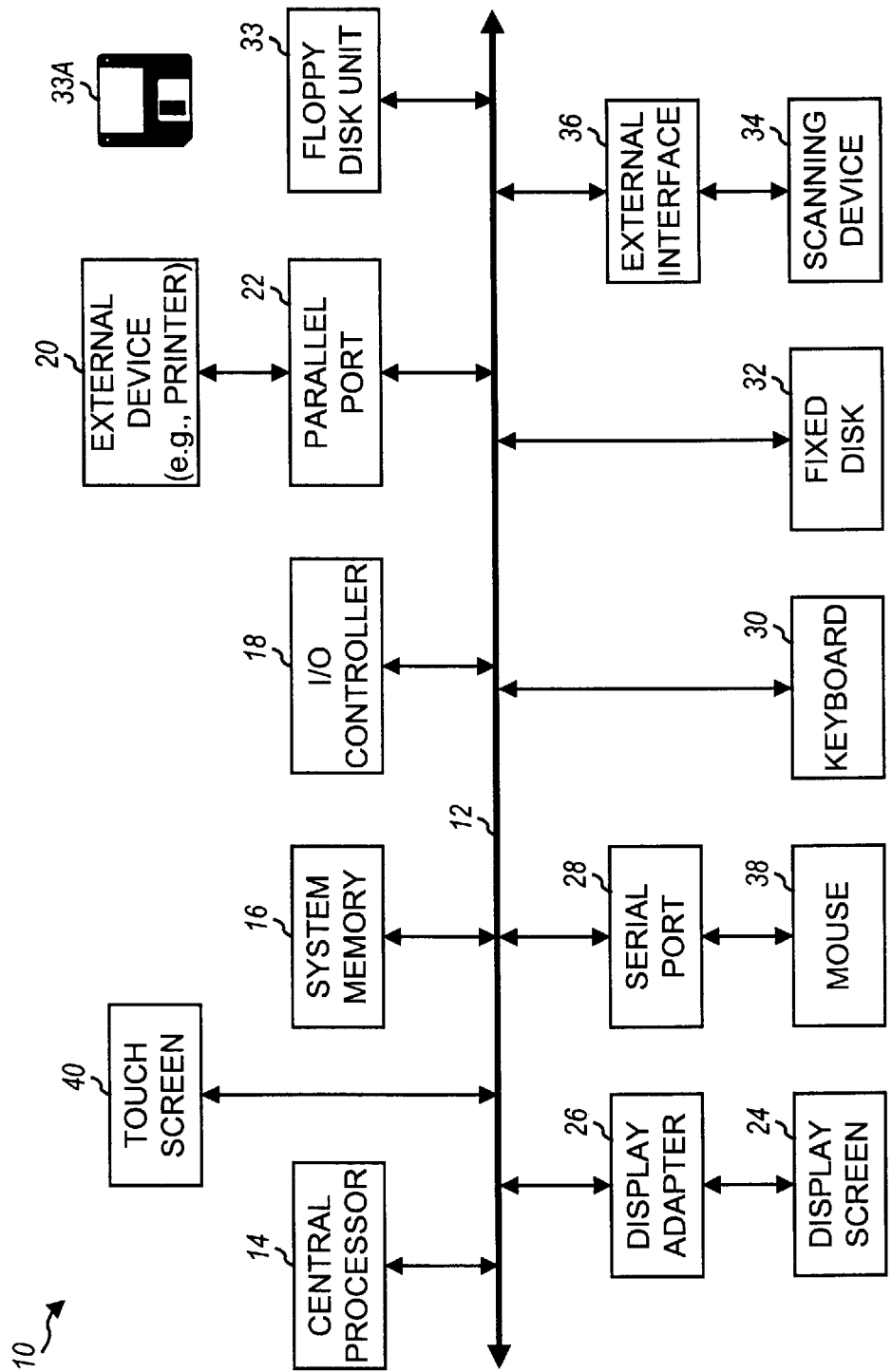
FIG. 1 depicts a representative computer system suitable for implementing the present invention.

FIG. 1 shows basic subsystems of a computer system suitable for use with the present invention. In FIG. 1, computer system 10 includes bus 12 which interconnects major subsystems such as central processor 14, system memory 16, input/output (I/O) controller 18, an external device such as a printer 20 via parallel port 22, display screen 24 via display adapter 26, serial port 28, keyboard 30, fixed disk drive 32 and floppy disk drive 33 operative to receive a floppy disk 33A. Many other devices can be connected such as scanning device 34 connected via external interface 36, mouse 38 connected via serial port 28 and touch screen 40 connected directly. Many other devices or subsystems (not shown) may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as fixed disk 32 or floppy disk 33A. The present invention may also be implemented in the context of a digital copier or facsimile machine.

Figure 2:
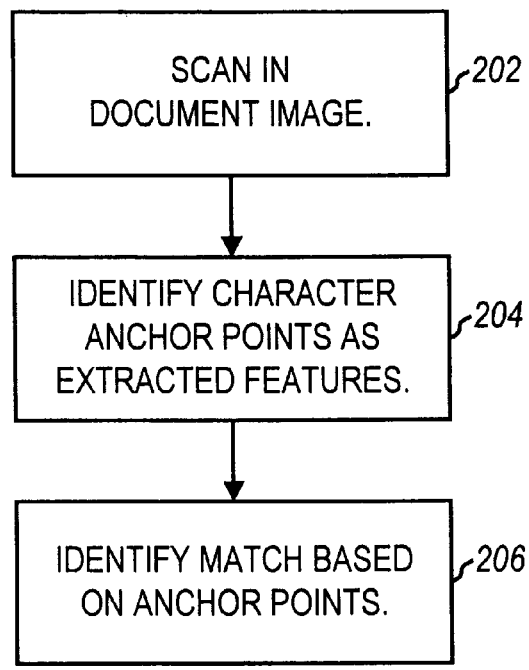
FIG. 2 depicts a top-level flowchart describing steps of document matching in accordance with one embodiment of the present invention.

FIG. 2 depicts a top-level flowchart describing steps of document matching in accordance with one embodiment of the present invention. At step 202, scanning device 34 scans in a document image to be matched. Of course, an electronic representation of the image may already be available from previous scanning or electronic transmission. At step 204, computer system 10 estimates the locations of anchor points, points that characterize the location of characters in the document image and develops a set of anchor points.

In a preferred embodiment, these anchor points are "pass codes" obtained from a compressed representation having special characteristics. As will be explained in greater detail with reference to FIG. 3., a pass code within a compressed representation of a given line indicates that a run of white or black pixels present substantially above the pass code on a previous line is not found on a current line.

The present invention contemplates other techniques for finding anchor points. For example, anchor points may be identified as being the centroids of characters in the document image.

At step 206, computer system 10 identifies a match to the input document image based on the set of anchor points developed in step 204. In one embodiment, sets of anchor points have previously been developed for document images in a database stored, e.g., on hard disk 32. Match identification then includes comparing the anchor point set developed for the document image to the sets developed for document images previously stored in the database. In one embodiment, this comparison is done using a Hausdorff metric as explained in greater detail below. The matching document image may then be presented to user by display on display screen 24 or in some other way.

The inventor has found that implementing step 204 as extraction of pass codes from certain compressed representations of the document image is very fast and results in a very distinct representation of the document image. The uniqueness of the representation improves matching performance.

Pass codes are found in so-called two-dimensionally encoded representations of images. In a one-dimensionally encoded representation of an image, individual lines are encoded independently with no reference to previous lines. Compression is achieved by encoding run lengths of consecutive runs of white or black pixels using a codeword alphabet. In a two-dimensionally encoded representation, a line is encoded by way of comparison to a reference line.

The CCITT Group III facsimile transmission standard uses a combination of a one-dimensional coding scheme applied to every $k^{th}$ line (typically, k equals 4) with a two-dimensional coding method. In the CCITT Group IV standard, all lines are coded two-dimensionally and the first line in an image is coded with respect to an all-white reference line.

Both the Group III and Group IV standards share a common two-dimensional encoding scheme. A complete description of this coding standard is found in Hunter & Robinson, "International Digital Facsimile Coding Standards", *Proceedings of the IEEE*, (July 1980), the contents of which are herein incorporated by reference for all purposes.

Figure 3:
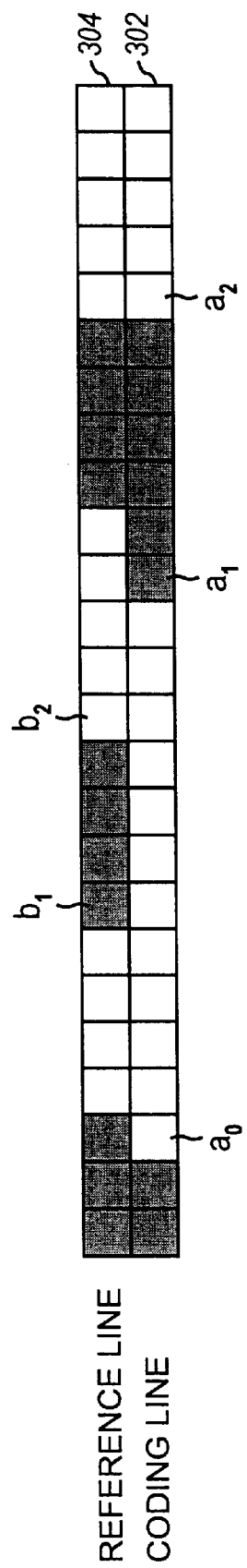
FIG. 3 is a simplified representation of an image line encoded in accordance with Group II facsimile coding standards.

General principles of the CCITT two-dimensional encoding scheme will now be discussed with reference to FIG. 3. FIG. 3 shows pixels of a coding line 302 to be encoded and pixels of a reference line 304 to which coding line 302 will be compared in the coding process. Encoding proceeds on a line-by-line basis. A codeword is assigned to each changing element, i.e., to each pixel having a different value than the previous pixel such as a white pixel following a black pixel or a black pixel following a white pixel.

FIG. 3 shows five such changing elements. A reference changing element $a_0$ is the changing element on the coding line before the changing element to be coded. A next changing element $a_1$ is the next changing element to be coded. The changing element after $a_1$ is $a_2$. On the reference line, $b_1$ is the next changing element on the reference line to the right of $a_0$ and having the same color as $a_1$. The changing element $b_2$ is the changing element to the right of $b_1$ on the reference line.

A pass code, "0001", represents the run beginning with changing element $a_1$ whenever the position of $b_2$ lies to the left of $a_1$. This is the situation depicted in FIG. 3 and indicates that a white or black run on the reference line is not adjacent to corresponding white or black runs on the coding line.

Many characters will have white pass codes attached to any holes they contain and black pass codes attached to their strokes. A pass code is not necessarily attached to every component because of the arrangement of components and the operation of the encoding process. However, it has been found that approximately 80% to 90% of the components have an attached pass code.

FIG. 4A depicts the pass codes in a scanned photocopy of a document. FIG. 4B depicts the pass codes in a scanned original of the document of FIG. 4A. It can be seen that the locations of the pass codes are very similar between the documents despite the image degradation. For each character, there is normally a pass code located at the lowest pixel, and for characters with flat bottoms, the pass code is normally at the lower left corner of the character.

Figure 5:
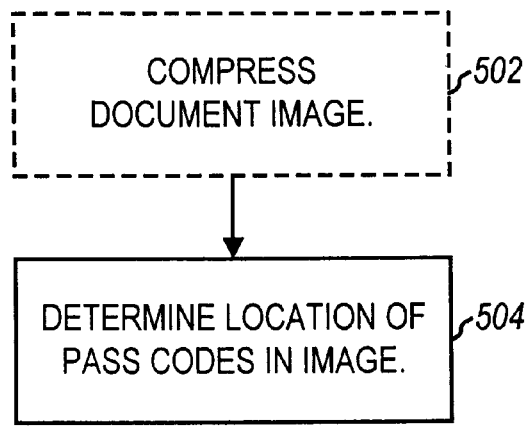
FIG. 5 is a flowchart describing steps of extracting pass codes from a compressed representation of a document image in accordance with one embodiment of the present invention.

FIG. 5 is a flowchart describing steps of extracting pass codes from a compressed representation of a document image in accordance with one embodiment of the present invention. At step 502, computer system 10 compresses a binary representation of the document image in accordance with a two-dimensional image coding scheme that uses passcodes. In one embodiment, this step is performed with the aid of a Group III or Group IV encoding system. If the present invention is implemented in the context of a facsimile receiver to match incoming faxes, the compressed representation has already been generated and step 502 is unnecessary.

At step 504, computer system 10 identifies the location of the pass codes in the compressed representation. If the image was locally compressed at step 502, the pass code locations may be trivially determined concurrently with compression. If the compressed representation has not been locally generated, computing system 10 takes a pass through the compressed representation to identify the horizontal and vertical locations of each pass code as referenced to the uncompressed image. Determining the vertical location of each pass code is accomplished by counting EOL (end of line) codewords in the compressed representation while passing through. To determine the horizontal location of each pass code, computer system 10 accumulates the number of pixels represented by each code word prior to the pass code in the current line. The result of step 504 is a set of pass code locations in the document image.

It should be noted that the process of locating pass codes does not require that computer system 10 actually generate, store, or output decompressed pixel values. Also, since the compressed representation is smaller, the single pass through the representation is even faster than it would be through an uncompressed representation. Locating pass codes is thus a very fast, memory-efficient way to identify anchor points for characters. The speed advantage over feature extraction techniques that rely on connected component characteristics or optical character recognition is thus very great because these techniques require multiple passes through much larger uncompressed image representations.

Once feature extraction is complete, the set of anchor points is matched to previously obtained sets of anchor points for prospective matching document images. In one embodiment, the Hausdorff distance metric is used to find the previously obtained set of anchor points.

The original Hausdorff distance metric operates to measure the difference between two point sets $A=a_1, \ldots, a_m$ and $B = b_1, \ldots, b_n$. The original Hausdorff distance between the two sets is then $$H(A,B) = \max(h(A,B), h(B,A))$$

where $$h(A,B) = \max_{a \in A} \min_{b \in B} \|a-b\|$$

The function h(A,B) measures the distance from a to its nearest neighbor in B. Thus the Hausdorff distance, H(a,b) measures distance between the point of A that is farthest from any point of B and vice versa. Intuitively, if the Hausdorff distance is d, then every point of A must be within a distance d of some point of B and vice versa.

A weakness of the original Hausdorff metric is its sensitivity to "outliers." These are points that cause the original Hausdorff metric to return a large value that is not reflective of the match between the two point sets. For example, a single point in set A that is 10 pixels away from the closest point in set B would cause the original Hausdorff metric to return a value of 10. This could occur even though every other point in A is within one pixel of every other point in B.

Another embodiment takes advantage of a modified Hausdorff metric optimized for scene analysis. This modified metric is described in Huttenlocher, Klanderman, and Rucklidge, "Comparing Images Using the Hausdorff Distance," *IEEE Transactions on Pattern Analysis and Machine Intelligence* (September 1993), pp. 850–863, which is herein incorporated by reference for all purposes. The modified Hausdorff measure solves the problem of outliers and provides a robust measure of the distance between point sets derived from binary images.

The modified Hausdorff measure may be summarized as:

$$h_k(A,B) = kth_{a \in A} \min_{b \in B} \|a-b\|$$

where the "kth" function which returns the kth ranked value replaces the max function of the general Hausdorff measure. When $h_k(A,B) <= $ delta, a set $A_k$ is obtained that contains points that are within delta pixels of points in B. The number of points in $A_k$ can also be expressed as a percentage of the points in A.

One method for computing the modified Hausdorff measure uses the well known processes of dilation and correlation. The dilation of a point with a disk of radius delta replaces that point with a disk of radius delta centered at that point. Such a dilation is applied to the set B. The correlation of A with the dilated version of B returns the number of points p in A that are within delta pixels of some point in B. If $p >= k$ then A has been found in B. That is, $h_k(A,B) <= $ delta.

The reverse Hausdorff measure $h_k(B,A)$ is also calculated with the same technique. Acceptable values of $h_k(A,B)$ and $h_k(B,A)$ (i.e., less than or equal to pre-specified constants $delta_1$ and $delta_2$ respectively) guarantee that an instance of A is found in B that are visually very similar. That is, A does not match a plain black patch. A further modification accounts for x,y translation of A by simply translating A by a given translation t before calculating the modified Hausdorff measure. In the matching process, a range of t values are tried to find the smalles Hausdorff distance.

An efficient implementation of the further modified Hausdorff metrics explained above is provided in Rucklidge, "Efficient Computation of the Minimum Hausdorff Distance for Visual Recognition", TR94–1454, Cornell University, Department of Computer Science Sep. 8, 1994, the contents of which are also incorporated by reference herein for all purposes.

It should be noted that feature extraction and matching may be based on only a section of the image as long as the section is chosen consistently. Using pass code extraction and the further modified Hausdorff metric, an embodiment of the present invention has been tested against 800 document images from the well-known University of Washington CD-ROM. The first 526 of these images were matched to the database of 800 images using 1 inch square patch. 152 of the 526 images had a duplicate elsewhere in the database that had been scanned in a different way. 114 were scanned from first generation photocopies with the original scanned images also present in the database. 19 images were first generation photocopies that matched to third or later generation photocopies. 19 third or later generation photocopies matched to first generation photocopies.

The technique of the present invention provided 100% accuracy in matching each image patch to itself and 92.5% accuracy in identifying photocopies in the database. When implemented on a 70 MHz Sparcstation 20 available from Sun Microsystems of Mountain View, Calif., matching a given image patch to the database of 800 image patches required approximately 10 minutes.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

What is claimed is:

1. A computer-implemented method for matching a particular document image to a plurality of prospective matching document images comprising:

detecting changes in pixel values between successive pixels in said particular document image;

determining locations of said detected changes in pixel values;

capturing said determined locations of said detected changes as locations of anchor points, said anchor points indicative of features of said particular document image;

comparing a set of anchor point locations captured for said particular document image to sets of anchor points locations previously obtained for said prospective matching document images, wherein said comparing comprises determining a Hausdorff distance between said set of anchor point locations for said particular document image to each of said sets of anchor point locations for said prospective matching document images; and identifying a best matching document image from among said prospective matching document images based on said comparing of said anchor point locations, wherein said identifying comprises determining said best matching document image to be a prospective matching document image having a smallest Hausdorff distance to said particular document image.

2. The method of claim 1 wherein said detecting, determining, and capturing comprise:

accepting a compressed representation of said particular document image as input, wherein said compressed representation includes pass codes, each pass code indicating that a run of consecutive black or white pixels in a line of said image has no corresponding run on an adjacent line; and extracting locations of said pass codes from said compressed representation, wherein said pass code locations are indicative of said anchor point locations.

3. The method of claim 2 wherein said compressed representation is a CCITT Group III facsimile representation.

4. The method of claim 2 wherein said compressed representation is a CCITT Group IV facsimile representation.

5. The method of claim 2 wherein each of said anchor point locations is defined by a horizontal location, wherein said horizontal location is determined by accumulating number of pixels represented by codewords prior to said anchor point location.

6. The method of claim 5 wherein each of said anchor point locations is further defined by a vertical location, wherein said vertical location is determined by counting end of line indicators.

7. The method of claim 2 wherein said anchor point locations are determined by a single pass through said particular document image.

8. The method of claim 2 wherein said pass codes are determined by detecting changing elements.

9. The method of claim 1 wherein said anchor points are indicative of approximate locations of characters in said particular document image.

10. The method of claim 1 wherein said anchor points correspond to anchors of characters.

11. A computer program product for matching a particular document image to a plurality of prospective matching document images comprising:

code for detecting changes in pixel values between successive pixels in said particular document image;

code for determining locations of said detected changes in pixel values;

code for capturing said determined locations of said detected changes as locations of anchor points, said anchor points indicative of features of said particular document image;

code for comparing a set of anchor point locations captured for said particular document image to sets of anchor points locations previously obtained for said prospective matching document images, wherein said comparing code comprises code for determining a Hausdorff distance between said set of anchor point locations for said particular document image to each of said sets of anchor point locations for said prospective matching document images; and code for identifying a best matching document image from among said prospective matching document images based on said comparing of said anchor locations, wherein said code for identifying comprises code for determining said best matching document image to be a prospective matching document image having a smallest Hausdorff distance to said particular document image; and a computer-readable storage medium for storing the codes.

12. The product of claim 7 wherein said detecting, determining, and capturing code comprise:

code for accepting a compressed representation of said particular document image as input, wherein said compressed representation includes pass codes, each pass code indicating that a run of consecutive black or white pixels in a line of said image has no corresponding run on an adjacent line; and code for extracting locations of said pass codes from said compressed representation, wherein said pass code locations are indicative of said anchor point locations.

13. The product of claim 12 wherein said compressed representation is a CCITT Group III facsimile representation.

14. The product of claim 12 wherein said compressed representation is a CCITT Group IV facsimile representation.

15. The product of claim 12 wherein each of said anchor point locations is defined by a horizontal location, wherein said horizontal location is determined by accumulating number of pixels represented by codewords prior to said anchor point location.

16. The product of claim 15 wherein each of said anchor point locations is further defined by a vertical location, wherein said vertical location is determined by counting end of line indicators.

17. The product of claim 12 wherein said anchor point locations are determined by a single pass through said particular document image.

18. The product of claim 12 wherein said pass codes are determined by detecting changing elements.

19. The product of claim 11 wherein said anchor points are indicative of approximate locations of characters in said particular document image.

20. The product of claim 11 wherein said anchor points correspond to anchors of characters.

21. A computer system configured to compare document images, said computer system comprising:

a storage device for storing electronic representations of images of documents; and a processing system configured to:

extract locations of pass codes associated with a particular document image, wherein each pass code indicates that a run of consecutive black or white pixels in a line of said particular document image has no corresponding run on an adjacent line;

comparing a set of pass code locations extracted for said particular document image to sets of pass code locations previously obtained for a plurality of prospective matching document images, wherein said comparing comprises determining a Hausdorff distance between said set of pass code locations for said particular document image to each of said sets of pass code locations for said prospective matching document images; and identify a best matching document image from among said plurality of prospective matching document images based on said comparing of said pass code locations, wherein said identifying comprises determining said best matching document image to be a prospective matching document image having a smallest Hausdorff distance to said particular document image.

22. The computer system of claim 21 wherein said processing system is further configured to:

receive a compressed representation of said particular document image as input, wherein said compressed representation includes said pass codes.

23. The computer system of claim 22 wherein said compressed representation is a CCITT Group III facsimile representation.

24. The computer system of claim 22 wherein said compressed representation is a CCITT Group IV facsimile representation.

25. The computer system of claim 21 wherein each of said pass code locations is defined by a horizontal location, wherein said horizontal location is determined by accumulating number of pixels represented by codewords prior to said pass code location.

26. The computer system of claim 25 wherein each of said anchor point locations is further defined by a vertical location, wherein said vertical location is determined by counting end of line indicators.

27. The computer system of claim 21 wherein said pass word locations are determined by a single pass through said particular document image.

28. A computer-implemented method for matching a compressed representation of a particular document image to a plurality of prospective matching document images comprising:

accepting said compressed representation of said particular document image, said compressed representation including pass codes, each pass code indicating that a run of consecutive black or white pixels in a line of said image has no corresponding run on an adjacent line;

extracting locations of said pass codes from said compressed representation, wherein said pass code locations are indicative of locations of anchor points, said anchor points indicative of features of said particular document image;

comparing a set of anchor point locations extracted for said particular document image to sets of anchor points locations previously obtained for said prospective matching document images, wherein said comparing comprises determining a Hausdorff distance between said set of anchor point locations for said particular document image to each of said sets of anchor point locations for said prospective matching document images; and identifying a best matching document image from among said prospective matching document images based on said comparing of said anchor point locations, wherein said identifying comprises determining said best matching document image to be a prospective matching document image having a smallest Hausdorff distance to said particular document image.

29. The method of claim 28 wherein said compressed representation is a CCITT Group III facsimile representation.

30. The method of claim 28 wherein said compressed representation is a CCITT Group IV facsimile representation.

31. The method of claim 28 wherein said anchor points are indicative of approximate locations of characters in said particular document image.

32. A computer program product for matching a compressed representation of a particular document image to a plurality of prospective matching document images comprising:

code for accepting said compressed representation of said particular document image, said compressed representation including pass codes, each pass code indicating that a run of consecutive black or white pixels in a line of said image has no corresponding run on an adjacent line;

code for extracting locations of said pass codes from said compressed representation, wherein said pass code locations are indicative of locations of anchor points, said anchor points indicative of features of said particular document image;

code for comparing a set of anchor point locations extracted for said particular document image to sets of anchor points locations previously obtained for said prospective matching document images, wherein said code for comparing comprises code for determining a Hausdorff distance between said set of anchor point locations for said particular document image to each of said sets of anchor point locations for said prospective matching document images;

code for identifying a best matching document image from among said prospective matching document images based on said comparing of said anchor point locations, wherein said code for identifying comprises code for determining said best matching document image to be a prospective matching document image having a smallest Hausdorff distance to said particular document image; and a computer-readable storage medium configured to store the codes.

33. The product of claim 32 wherein said compressed representation is a CCITT Group III facsimile representation.

34. The product of claim 32 wherein said compressed representation is a CCITT Group IV facsimile representation.

35. The product of claim 32 wherein said anchor points are indicative of approximate locations of characters in said particular document image.

36. A computer-implemented method for matching a particular document image to a plurality of prospective matching document images comprising:

detecting changes in pixel values between successive pixels in said particular document image;

determining locations of said detected changes in pixel values;

capturing said determined locations of said detected changes as a two-dimensional (2-D) representation of extracted features for said particular document image;

comparing said 2-D representation for said particular document image to 2-D representations previously obtained for said prospective matching document images, wherein said comparing comprises determining a Hausdorff distance between said 2-D representation for said particular document image to each of said 2-D representations for said prospective matching document images; and identifying a best matching document image from among said prospective matching document images based on said comparing, wherein said identifying comprises determining said best matching document image to be a prospective matching document image having a smallest Hausdorff distance to said particular document image.

37. The method of claim 36, wherein said detecting, determining, and capturing comprise:

accepting a compressed representation of said particular document image as input, wherein said compressed representation includes pass codes, each pass code indicating that a run of consecutive black or white pixels in a line of said image has no corresponding run on an adjacent line; and extracting locations of said pass codes from said compressed representation, and wherein said 2-D representation includes said pass code locations.

38. The method of claim 37, wherein said compressed representation is a CCITT Group III or Group IV facsimile representation.

* * * * *